United States Patent
Laaksonen et al.

(10) Patent No.: US 11,627,427 B2
(45) Date of Patent: Apr. 11, 2023

(54) ENABLING RENDERING, FOR CONSUMPTION BY A USER, OF SPATIAL AUDIO CONTENT

(71) Applicant: Nokia Technologies Oy, Espoo (FI)

(72) Inventors: Lasse Laaksonen, Tampere (FI); Arto Lehtiniemi, Lempaala (FI); Antti Eronen, Tampere (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/772,053

(22) PCT Filed: Dec. 5, 2018

(86) PCT No.: PCT/EP2018/083647
§ 371 (c)(1),
(2) Date: Jun. 11, 2020

(87) PCT Pub. No.: WO2019/121018
PCT Pub. Date: Jun. 27, 2019

(65) Prior Publication Data
US 2021/0076153 A1    Mar. 11, 2021

(30) Foreign Application Priority Data
Dec. 18, 2017  (EP) ..................... 17208008

(51) Int. Cl.
*H04S 7/00*    (2006.01)
*G06F 16/687*  (2019.01)
(Continued)

(52) U.S. Cl.
CPC ............ *H04S 7/303* (2013.01); *G06F 16/637* (2019.01); *G06F 16/683* (2019.01); *G06F 16/687* (2019.01); *H04S 2400/03* (2013.01)

(58) Field of Classification Search
CPC .... H04S 7/303; H04S 2400/03; G06F 16/687; G06F 16/637; G06F 16/683
See application file for complete search history.

(56) References Cited

U.S. PATENT DOCUMENTS

| 8,531,602 B1* | 9/2013 | Tudor | G11B 27/28 |
| | | | 348/485 |
| 2005/0138540 A1* | 6/2005 | Baltus | G06F 40/194 |
| | | | 715/229 |

(Continued)

FOREIGN PATENT DOCUMENTS

| CH | 708800 A2 | 5/2015 |
| CN | 102186544 A | 9/2011 |

(Continued)

OTHER PUBLICATIONS

Machine translation of CN 106162378 (Year: 2016).*
(Continued)

*Primary Examiner* — Walter F Briney, III
(74) *Attorney, Agent, or Firm* — Alston & Bird LLP

(57) ABSTRACT

An apparatus comprising: means for causing selection of spatial audio content in dependence upon a position of a user in a virtual space; • means for causing rendering, for consumption by the user, of the selected spatial audio content including a first spatial audio content; • means for causing, after user consumption of the first spatial audio content, recording of data relating to the first spatial audio content; • means for using, at a later time, the recorded data to detect a new event relating to the first spatial audio content, the new event comprises that the first spatial audio content has been adapted for which a new spatial content is created, for example in the form of a limited preview; and • means for providing a user-selectable option to enable rendering, for consumption by the user, of the first spatial (Continued)

audio content by rendering a simplified sound object representative, which can be a downmix or clustered audio objects.

20 Claims, 9 Drawing Sheets

(51) Int. Cl.
  *G06F 16/635* (2019.01)
  *G06F 16/683* (2019.01)

(56) References Cited

U.S. PATENT DOCUMENTS

| | | | |
|---|---|---|---|
| 2006/0251263 | A1 | 11/2006 | Vronay |
| 2009/0265369 | A1 | 10/2009 | Hyman et al. |
| 2009/0282335 | A1* | 11/2009 | Alexandersson ......... H04S 7/30 715/716 |
| 2014/0119581 | A1 | 5/2014 | Tsingos et al. |
| 2015/0169280 | A1 | 6/2015 | Suzuki et al. |
| 2015/0245138 | A1 | 8/2015 | Bender et al. |
| 2016/0142830 | A1 | 5/2016 | Hu |
| 2017/0034639 | A1 | 2/2017 | Chon |
| 2018/0349406 | A1* | 12/2018 | Shortlidge ............ G06F 16/178 |
| 2020/0221248 | A1* | 7/2020 | Eubank ................... G06F 3/165 |

FOREIGN PATENT DOCUMENTS

| | | | | |
|---|---|---|---|---|
| CN | 102726066 | A | | 10/2012 |
| CN | 106068638 | A | | 11/2016 |
| CN | 106162378 | A * | | 11/2016 ........... G06F 16/738 |
| CN | 106664500 | A | | 5/2017 |
| CN | 107005778 | A | | 8/2017 |
| EP | 3018918 | A1 | | 5/2016 |
| EP | 3232689 | A1 | | 10/2017 |
| EP | 3261367 | A1 | | 12/2017 |
| GB | 2562036 | A | | 11/2018 |
| GB | 2567244 | A | | 4/2019 |
| WO | 2019/073110 | A1 | | 4/2019 |

OTHER PUBLICATIONS

Office action received for corresponding Chinese Patent Application No. 201880081596.9, dated Dec. 28, 2020, 8 pages of office action and 7 pages of Translation available.

"Sony's 'Joshua Bell VR Experience' on PSVR is Among the Best VR Video You'll Find on Any Headset", Road Tovr, Retrieved on May 7, 2020, Webpage available at : https://www.roadtovr.com/now-psvr-sonys-joshua-bell-vr-experience-among-best-vr-video-youll-find-headset/.

Wefers et al., "Real-time Auralization of Coupled Rooms", Proc of the EAA Symposium on Auralization, 2009, pp. 1-6.

Schröder et al., "Virtual Reality System at RWTH Aachen University", Proceedings of the International Symposium on Room Acoustics (ISRA), Aug. 29-31, 2010, pp. 1-9.

Zidan et al., "Room Acoustical Parameters of Two Electronically Connected Rooms", The Journal of the Acoustical Society of America, vol. 138, No. 4, Oct. 2015, pp. 2235-2245.

Extended European Search Report received for corresponding European Patent Application No. 17208008.7, dated Jun. 26, 2018, 9 pages.

International Search Report and Written Opinion received for corresponding Patent Cooperation Treaty Application No. PCT/EP2018/083647, dated Feb. 6, 2019, 14 pages.

Office Action for Chinese Application No. 201880081596.9 dated Jun. 1, 2021, 12 pages.

Office Action for European Application No. 17208008.7 dated Jun. 2, 2021, 7 pages.

Office action received for corresponding European Patent Application No. 17208008.7, dated Jun. 2, 2021, 7 pages.

Office Action for Chinese Application No. 201880081596.9 dated Jan. 12, 2022, 11 pages.

Office Action for Chinese Application No. 201880081596.9 dated Aug. 17, 2022, 10 pages.

Office Action for European Application No. 17208008.7 dated Dec. 1, 2022, 9 pages.

* cited by examiner

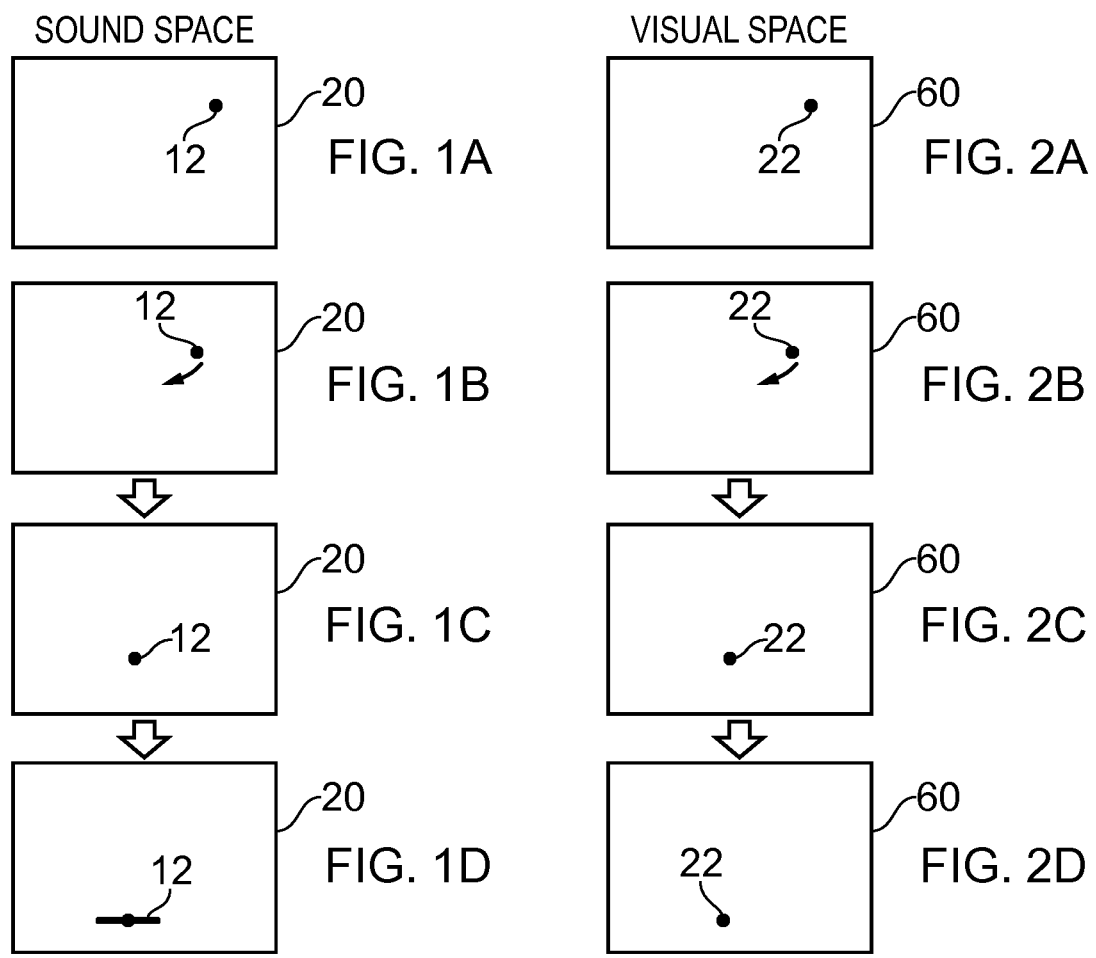

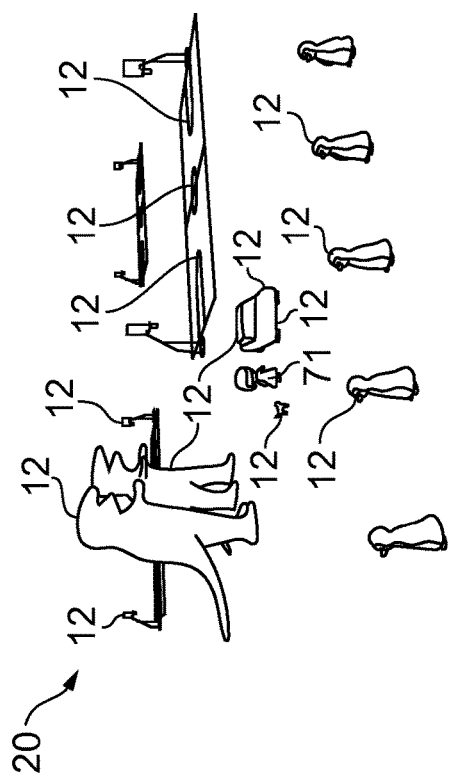
FIG. 9A
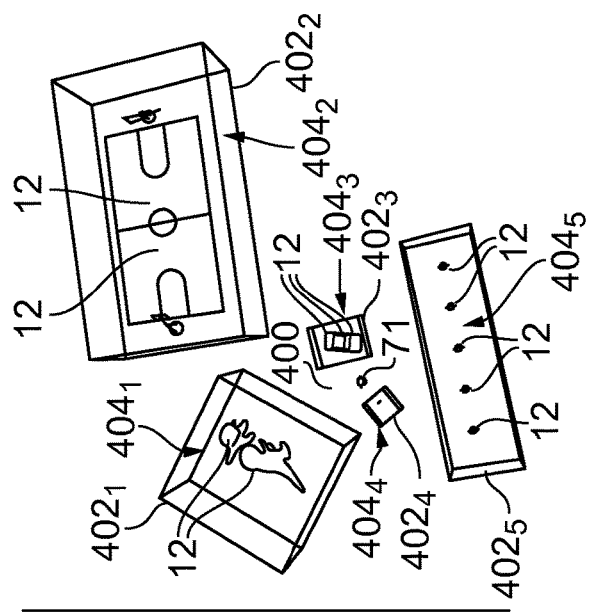
FIG. 9B
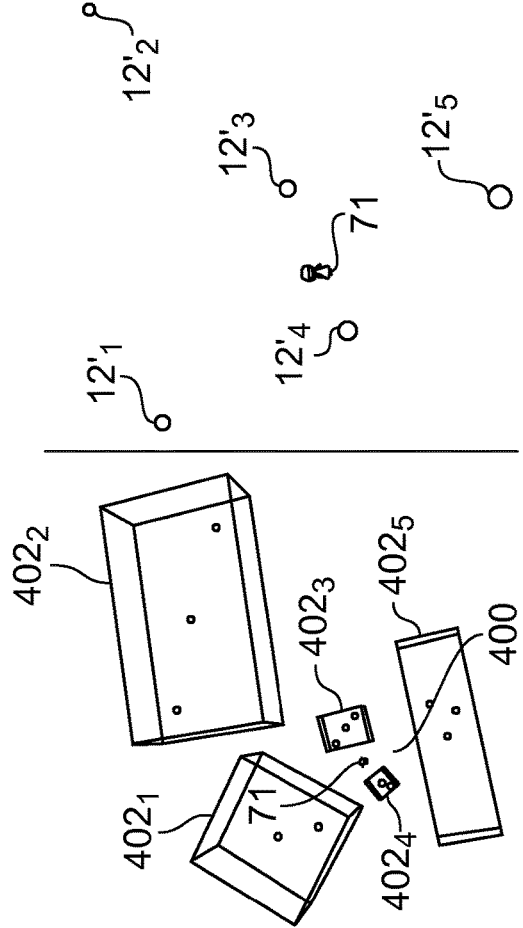
FIG. 10A
FIG. 10B
FIG. 10C

ENABLING RENDERING, FOR CONSUMPTION BY A USER, OF SPATIAL AUDIO CONTENT

RELATED APPLICATION

This application claims priority to PCT Application No. PCT/EP2018/083647, filed on Dec. 5, 2018, which claims priority to EP Application No. 17208008.7, filed on Dec. 18, 2017, each of which is incorporated herein by reference in its entirety.

TECHNOLOGICAL FIELD

Embodiments of the present invention relate to enabling rendering, for consumption by a user, of spatial audio content

BACKGROUND

Spatial (or volumetric) audio involves the rendering of different sound objects at different three-dimensional locations. Each sound object can be individually controlled. For example, its intensity may be controlled, its position (location and/or orientation) may be controlled or other characteristics of the sound object may be individually controlled. This enables the relocation of sound sources within a sound scene that is rendered to a user. It also enables the engineering of that sound scene.

Spatial audio may, for example, be rendered to a user using multiple speakers e.g. 5.1, 7.1, 22.2 surround sound or may be rendered to a user via headphones e.g. binaural rendering.

Spatial audio content may be audio content or the audio part of multi-media content. Where multi-media content is rendered the visual content may, for example, be rendered via mediated reality, for example virtual reality or augmented reality.

BRIEF SUMMARY

It may, in some circumstances, be desirable to allow a user, who may, for example, be a content consumer or a content engineer, to comprehend the content of a sound scene without fully rendering the sound scene to that user.

According to various, but not necessarily all, embodiments of the invention there is provided an apparatus comprising:
means for causing selection of spatial audio content in dependence upon a position of a user;
means for causing rendering, for consumption by the user, of the selected spatial audio content including first spatial audio content;
means for causing, after user consumption of the first spatial audio content, recording of data relating to the first spatial audio content;
means for using, at a later time, the recorded data to detect a new event relating to the first spatial audio content; and
means for providing a user-selectable option for the user to enable rendering, for consumption by the user, of the first spatial audio content by rendering a simplified sound object representative of the first spatial audio content.

In some but not necessarily all examples, using, at the later time, the recorded data to detect a new event comprises detecting that the first spatial audio content has been adapted to create new first spatial audio content; and wherein providing a user-selectable option for the user to enable rendering, for consumption by the user, of the first spatial audio content comprises providing a user-selectable option for the user to enable rendering, for consumption by the user, of the new first spatial audio content.

In some but not necessarily all examples, using, at the later time, the recorded data to detect a new event comprises comparing recorded data for the first spatial audio content with equivalent data for the new first spatial audio content.

In some but not necessarily all examples, providing a user-selectable option for the user to enable rendering, for consumption by the user, of the first spatial audio content comprises causing rendering of a simplified sound object representative of the first spatial audio content or the new first spatial audio content.

In some but not necessarily all examples, providing a user-selectable option for the user to enable rendering, for consumption by the user, of the first spatial audio content comprises rendering a limited preview of the new first spatial audio content.

The preview may be limited because it is provided via a simplified sound object 12',12" and/or because it only gives an indication of what has changed.

For example, in some but not necessarily all examples, the limited preview depends upon how the new first spatial audio content for consumption differs from the user-consumed first spatial audio content.

In some but not necessarily all examples, providing a user-selectable option for the user to enable rendering, for consumption by the user, of the first spatial audio content comprises causing rendering of a simplified sound object dependent upon a selected subset of a group of one or more sound objects of the new first spatial audio content, at a selected position dependent upon a volume associated with the group of one or more sound objects and with an extent dependent upon the volume associated with the group of one or more sound objects.

In some but not necessarily all examples, providing a user-selectable option for the user to enable rendering, for consumption by the user, of the first spatial audio content comprises causing rendering of a simplified sound object that extends in a vertical plane.

In some but not necessarily all examples, providing a user-selectable option for the user to enable rendering, for consumption by the user, of the first spatial audio content comprises highlighting the new first spatial audio by rendering the new first spatial audio in preference to other spatial audio content.

In some but not necessarily all examples, the recorded data relating to the first spatial audio content comprises data identifying one or more of:
the first spatial audio content;
a version identifier of the first spatial audio content
an indication of when the user consumed the first spatial audio content
an indication of the user who consumed the first spatial audio content
an indication of a position of the user when the first spatial audio content was consumed
a starting point of consumption and an ending point of consumption defining the first spatial audio content.

In some but not necessarily all examples, the apparatus comprises:
means for dividing a sound space into different non-overlapping groups of one or more sound objects associated with different non-overlapping volumes of the sound space;
means for providing a user-selectable option for the user to enable rendering, for consumption by the user, of any one of the respective groups of one or more sound objects by interacting with the associated volume,
wherein providing a user-selectable option for a first group comprises rendering a simplified sound object dependent upon a selected subset of the sound objects of the first group.

In some but not necessarily all examples, interacting with the associated volume occurs by a virtual user approaching, staring at or entering the volume, wherein a position of the virtual user changes with a position of the user.

In some but not necessarily all examples, the apparatus comprises:
means for changing a position of a virtual user when a position of the user changes; means for causing, when the virtual user is outside a first volume associated with the first group, rendering of a simplified sound object dependent upon a selected first subset of the sound objects of the first group;
means for causing, when the virtual user is inside the first volume associated with the first group, rendering of the sound objects of the first group; and means for causing, when the virtual user is moving from outside first volume to inside the first volume, rendering of a selected second subset of the sound objects of the first group.

According to various, but not necessarily all, embodiments of the invention there is provided a method comprising:
causing selection of spatial audio content in dependence upon a position of a user; causing rendering, for consumption by the user, of the selected spatial audio content including first spatial audio content;
causing, after user consumption of the first spatial audio content, recording of data relating to the first spatial audio content;
using, at a later time, the recorded data to detect a new event relating to the first spatial audio content; and
providing a user-selectable option for the user to enable rendering, for consumption by the user, of the first spatial audio content by rendering a simplified sound object representative of the first spatial audio content.

According to various, but not necessarily all, embodiments of the invention there is provided a computer program that when loaded into a processor enables the processor to cause:
rendering, for consumption by the user, of the selected spatial audio content including first spatial audio content;
after user consumption of the first spatial audio content, recording of data relating to the first spatial audio content;
using, at a later time, the recorded data to detect a new event relating to the first spatial audio content; and
providing a user-selectable option for the user to enable rendering, for consumption by the user, of the first spatial audio content by rendering a simplified sound object representative of the first spatial audio content.

According to various, but not necessarily all, embodiments of the invention there is provided an apparatus comprising:
means for causing selection of spatial audio content in dependence upon a position of a user;
means for causing rendering of the selected spatial audio content;
means for causing, after rendering of the selected spatial audio content, recording of data relating to the selected spatial audio content;
means for using, at a later time, the recorded data to detect a new event relating to spatial audio content; and means for providing an option to enable rendering of spatial audio content by rendering a simplified sound object representative of the spatial audio content.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIGS. 1A, 1B, 1C, 1D illustrates examples of a sound space at different times and FIGS. 2A, 2B, 2C, 2D illustrates examples of a corresponding visual space at those times;

Figure 7:
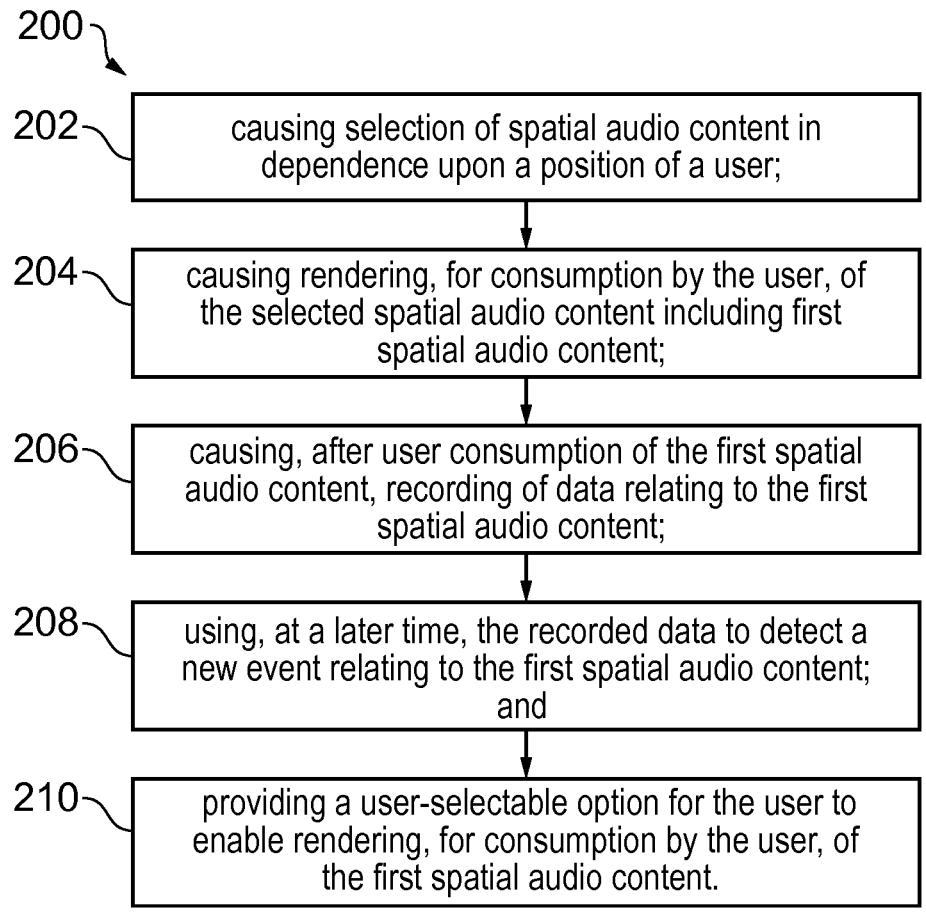
Figure 8:
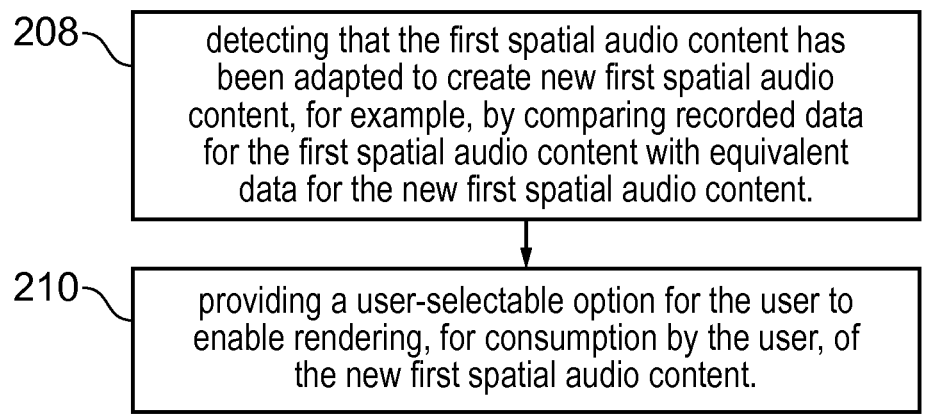
Figure 11:
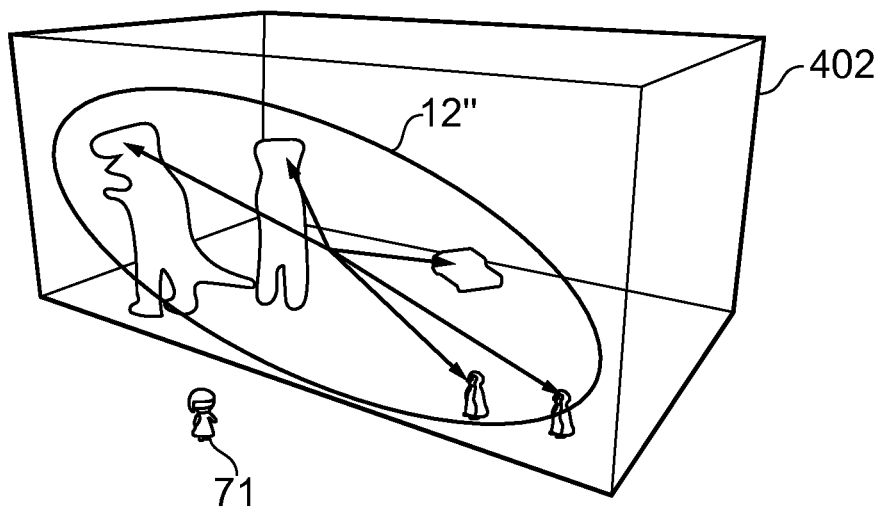
Figure 13:
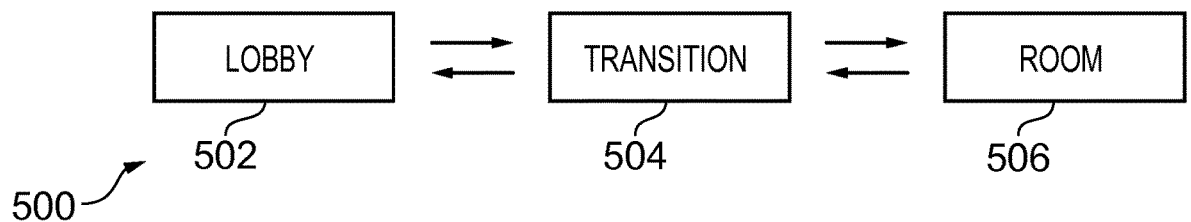
Figure 14A:
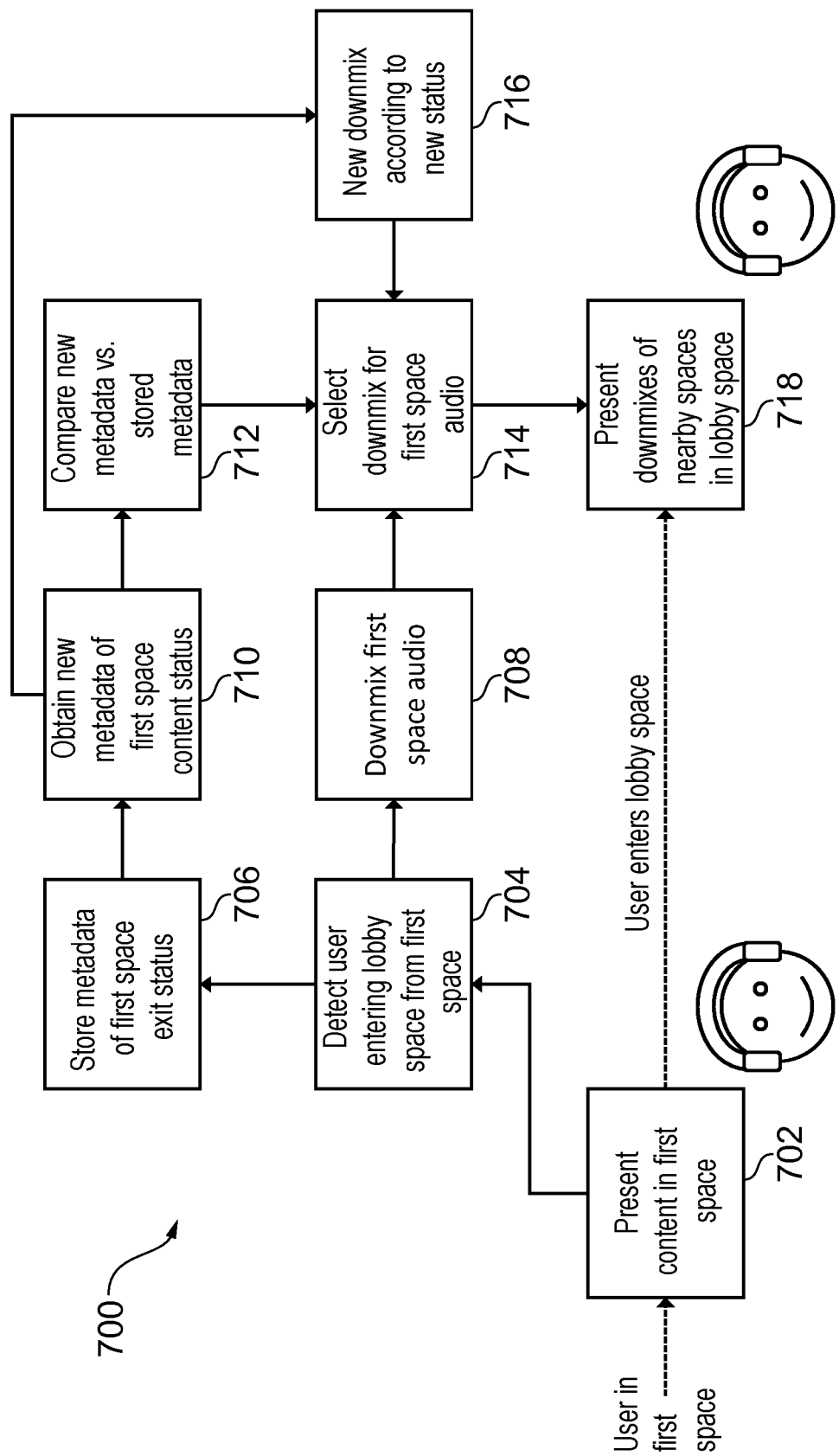
Figure 14B:
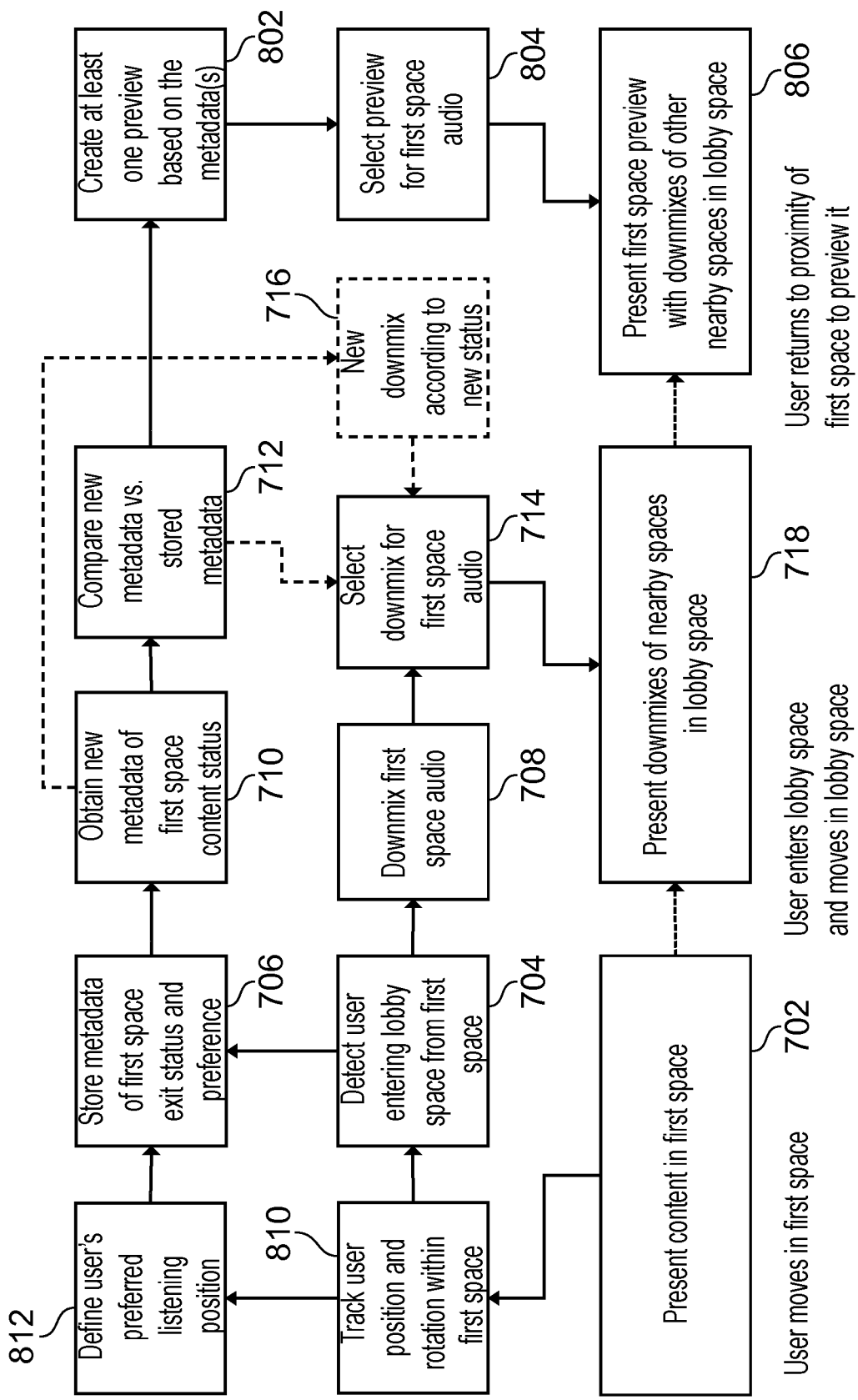

FIGS. 4A, 4B, 5A, 5B, 6A, 6B. illustrate rendering of mediated reality using virtual content including spatial audio content;

FIG. 7. illustrates an example of a method for enabling rendering, for consumption by a user, of first spatial audio content;

FIG. 8 illustrates an example of a portion of the method of FIG. 7;

FIG. 9A illustrates an example of a sound space comprising a large number of sound objects and FIG. 9B illustrates an example in which the sound space of FIG. 9A has been divided into non-overlapping volumes;

FIG. 10A illustrates volumes $402_i$, and the groups $404_i$, of sound objects 12 associated with those volumes $402_i$, and FIGS. 10B and 10C illustrate the rendering of a simplified sound object for each volume;

FIG. 11 illustrates the simplified sound object as a façade;

FIGS. 12A, 12B, 12C, 12D illustrate different examples of simplified sound objects rendered to a virtual user at a volume;

FIG. 13 illustrates an example in which different rendering processes, depend upon a location of the virtual user;

FIG. 14A presents an example of the method of FIG. 7;

FIG. 14B presents an example of the method of FIG. 14A augmented with a preview feature;

200.

Figure 15A:
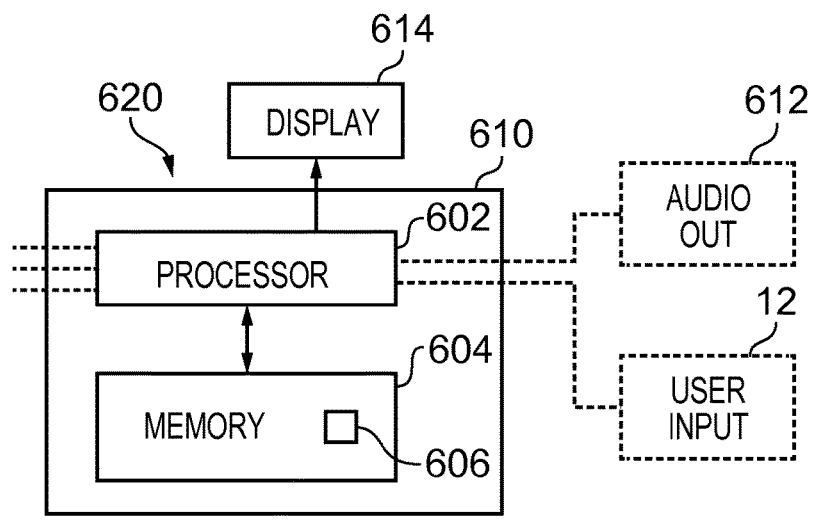
Figure 15B:
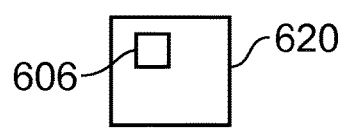

FIG. 15A illustrates an example of an apparatus that is configured to perform the described methods and provide the described systems;

FIG. 15B illustrates an example of a delivery mechanism for a computer program.

DEFINITIONS

"artificial environment" may be something that has been recorded or generated.

"virtual visual space" refers to fully or partially artificial environment that may be viewed, which may be three dimensional.

"virtual visual scene" refers to a representation of the virtual visual space viewed from a particular point of view (position) within the virtual visual space. 'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view (position) within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or location. A rendered sound object represents sounds rendered from a particular location.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point of view defines the sound scene and a notional (virtual) viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view (position) within the real space.

"real visual scene" refers to a visual representation of the real space viewed from a particular real point of view (position) within the real space.

"mediated reality" in this document refers to a user experiencing, for example visually, a fully or partially artificial environment (a virtual space) as a virtual scene at least partially rendered by an apparatus to a user. The virtual scene is determined by a point of view (virtual position) within the virtual space. Displaying the virtual scene means providing a virtual visual scene in a form that can be perceived by the user.

"augmented reality" in this document refers to a form of mediated reality in which a user experiences a partially artificial environment (a virtual space) as a virtual scene comprising a real scene, for example a real visual scene, of a physical real environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables mediated reality by, for example, providing one or more artificial virtual objects.

"mediated reality content" is virtual content which enables a user to experience, for example visually, a fully or partially artificial environment (a virtual space) as a virtual scene. Mediated reality content could include interactive content such as a video game or non-interactive content such as motion video.

"augmented reality content" is a form of mediated reality content which enables a user to experience, for example visually, a partially artificial environment (a virtual space) as a virtual scene. Augmented reality content could include interactive content such as a video game or non-interactive content such as motion video.

"virtual reality content" is a form of mediated reality content which enables a user to experience, for example visually, a fully artificial environment (a virtual space) as a virtual scene. Virtual reality content could include interactive content such as a video game or non-interactive content such as motion video.

"perspective-mediated" as applied to mediated reality, augmented reality or virtual reality means that user actions determine the point of view (virtual position) within the virtual space, changing the virtual scene;

"first person perspective-mediated" as applied to mediated reality, augmented reality or virtual reality means perspective mediated with the additional constraint that the user's real point of view (location and/or orientation) determines the point of view (virtual position) within the virtual space of a virtual user, "third person perspective-mediated" as applied to mediated reality, augmented reality or virtual reality means perspective mediated with the additional constraint that the user's real point of view does not determine the point of view (virtual position) within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user

"virtual user" defines the point of view (virtual position—location and/or orientation) in virtual space used to generate a perspective-mediated sound scene and/or visual scene. A virtual user may be a notional listener and/or a notional viewer.

"notional listener" defines the point of view (virtual position—location and/or orientation) in virtual space used to generate a perspective-mediated sound scene, irrespective of whether or not a user is actually listening "notional viewer" defines the point of view (virtual position—location and/or orientation) in virtual space used to generate a perspective-mediated visual scene, irrespective of whether or not a user is actually viewing.

Three degrees of freedom (3DoF) describes mediated reality where the virtual position is determined by orientation only (e.g. the three degrees of three-dimensional orientation). In relation to first person perspective-mediated reality, only the user's orientation determines the virtual position.

Six degrees of freedom (6DoF) describes mediated reality where the virtual position is determined by both orientation (e.g. the three degrees of three-dimensional orientation) and location (e.g. the three degrees of three-dimensional location). In relation to first person perspective-mediated reality, both the user's orientation and the user's location in the real space determine the virtual position.

DETAILED DESCRIPTION

The following description describes methods, apparatuses and computer programs that control how audio content is perceived. In some, but not necessarily all examples, spatial audio rendering may be used to render sound sources as sound objects at particular positions within a sound space.

FIG. 1A illustrates an example of a sound space 20 comprising a sound object 12 within the sound space 20. The sound object 12 may be a sound object as recorded (positioned at the same position as a sound source of the sound object) or it may be a sound object as rendered (positioned independently of the sound source). It is possible, for example using spatial audio processing, to modify a sound object 12, for example to change its sound or positional characteristics. For example, a sound object can be modified to have a greater volume, to change its location within the sound space 20 (FIGS. 1B & 1C) and/or to change its spatial extent within the sound space 20 (FIG. 1D). FIG. 1B illustrates the sound space 20 before movement of the sound object 12 in the sound space 20. FIG. 1C illustrates the same sound space 20 after movement of the sound object 12. FIG. 1D illustrates a sound space 20 after extension of the sound object 12 in the sound space 20. The sound space 20 of FIG. 1D differs from the sound space 20 of FIG. 1C in that the spatial extent of the sound object 12 has been increased so that the sound object 12 has a greater breadth (greater width).

The position of a sound source may be tracked to render the sound object 12 at the position of the sound source. This may be achieved, for example, when recording by placing a positioning tag on the sound source. The position and the position changes of the sound source can then be recorded. The positions of the sound source may then be used to control a position of the sound object 12. This may be particularly suitable where an up-close microphone such as a boom microphone or a Lavalier microphone is used to record the sound source.

In other examples, the position of the sound source within the visual scene may be determined during recording of the sound source by using spatially diverse sound recording. An example of spatially diverse sound recording is using a microphone array. The phase differences between the sound recorded at the different, spatially diverse microphones, provides information that may be used to position the sound source using a beam forming equation. For example, time-difference-of-arrival (TDOA) based methods for sound source localization may be used.

The positions of the sound source may also be determined by post-production annotation. As another example, positions of sound sources may be determined using Bluetooth-based indoor positioning techniques, or visual analysis techniques, a radar, or any suitable automatic position tracking mechanism.

In some examples, a visual scene 60 may be rendered to a user that corresponds with the rendered sound space 20. The visual scene 60 may be the scene recorded at the same time the sound source that creates the sound object 12 is recorded.

FIG. 2A illustrates an example of a visual space 60 that corresponds with the sound space 20. Correspondence in this sense means that there is a one-to-one mapping between the sound space 20 and the visual space 60 such that a position in the sound space 20 has a corresponding position in the visual space 60 and a position in the visual space 60 has a corresponding position in the sound space 20. Corresponding also means that the coordinate system of the sound space 20 and the coordinate system of the visual space 20 are in register such that an object is positioned as a sound object 12 in the sound space 20 and as a visual object 22 in the visual space 60 at the same common position from the perspective of a user. The sound space 20 and the visual space 60 may be three-dimensional.

FIG. 2B illustrates a visual space 60 corresponding to the sound space 20 of FIG. 1B, before movement of the visual object 22, corresponding to sound source 12, in the visual space 60.

FIG. 2C illustrates the same visual space 60 corresponding to the sound space 20 of FIG. 1C, after movement of the visual object 22. FIG. 2D illustrates the visual space 60 after extension of the sound object 12 in the corresponding sound space 20. While the sound space 20 of FIG. 1D differs from the sound space 20 of FIG. 1C in that the spatial extent of the sound object 12 has been increased so that the sound object 12 has a greater breadth, the visual space 60 is not necessarily changed.

Figure 3:
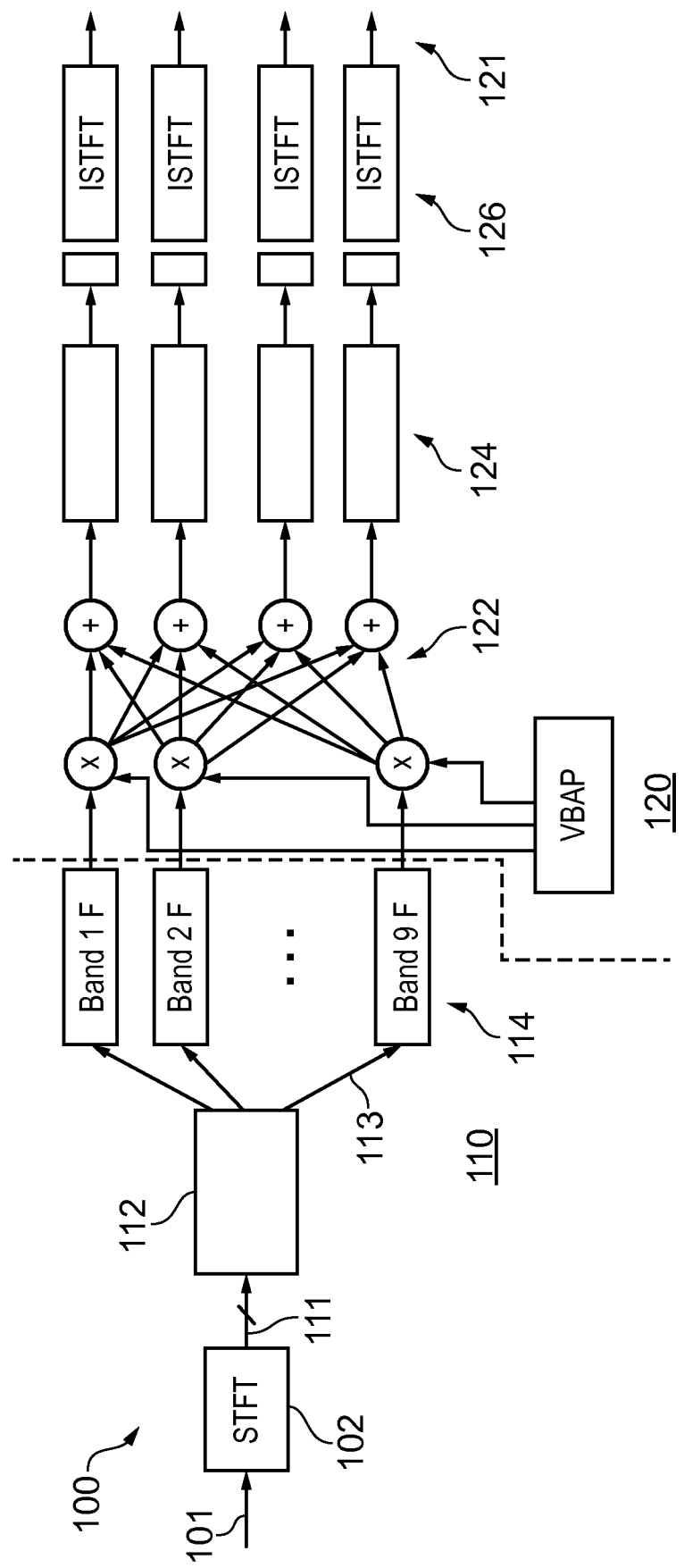
FIG. 3 illustrates an example of a spatial audio processing system.

FIG. 3 illustrates an example of a spatial audio processing system 100 comprising a spectral allocation module 110 and a spatial allocation module 120.

The spectral allocation module 110 takes frequency sub-channels 111 of a received input audio signal 101 and allocates them to multiple spatial audio channels 114 as spectrally-limited audio signals 113.

The allocation may be a quasi-random allocation (for example based on a Halton sequence) or may be determined based on a set of predefined rules. The predefined rules may, for example, constrain spatial-separation of spectrally-adjacent frequency sub-channels 111 to be above a threshold value. In some but not necessarily all examples, the allocation module 112 is a programmable filter bank.

The spatial allocation module 120 controls mixing 122 of the different spatial audio channels 114 across different audio device channels 124 that are rendered by different audio output devices. Each spatial audio channel 114 is thus rendered at a different location within a sound space 20. The number of audio device channels is defined by the number of loudspeakers e.g. 2.0 (binaural), 4.0 (quadraphonic) or 5.1, 7.1, 22.2 etc surround sound.

The sound space 20 may be considered to be a collection of spatial audio channels 114 where each spatial audio channel 114 is a different direction. In some examples, the collection of spatial audio channels 114 may be globally defined for all sound objects 12. In other examples, the collection of spatial audio channels 114 may be locally defined for each sound object 12. The collection of spatial audio channels 114 may be fixed or may vary dynamically with time.

In some but not necessarily all examples, the input audio signal 101 comprises a monophonic source signal and comprises, is accompanied with or is associated with one or more spatial processing parameters defining a position and/or spatial extent of the sound source that will render the monophonic source signal 101.

In some but not necessarily all examples, each spatial audio channel 114 may be rendered as a single rendered sound source using amplitude panning signals 121, for example, using Vector Base Amplitude Panning (VBAP).

For example, in spherical polar co-ordinates the direction of the spatial audio channel $S_{nm}$ may be represented by the couplet of polar angle $\vartheta_n$ and azimuthal angle $\phi_m$. Where $\vartheta_n$ is one polar angle in a set of N possible polar angles and $\phi m$ is one azimuthal angle in a set of M possible azimuthal angles. A sound object 12 at position z may be associated with the spatial audio channel $S_{nm}$ that is closest to Arg(z). If a sound object 12 is associated with a spatial audio channel $S_{nm}$, then it is rendered as a point source. A sound object 12 may however have spatial extent and be associated with a plurality of spatial audio channels 114. For example, a sound object 12 may be simultaneously rendered in a set of spatial audio channels {S} defined by Arg(z) and a spatial extent of the sound object 12. That set of spatial audio channels {S} may, for example, include the set of spatial audio channels $S_{n'm'}$ for each value of n' between n−$\delta_n$ and n+$\delta_n$ and of m' between n−$\delta_m$ and n+$\delta_m$, where n and m define the spatial audio channel closest to Arg(z) and $\delta_n$ and $\delta_m$ define in combination a spatial extent of the sound object 12. The value of $\delta_n$ defines a spatial extent in a polar direction and the value of $\delta_m$ defines a spatial extent in an azimuthal direction. The number of spatial audio channels and their spatial relationship in the set of spatial audio channels {S}, allocated by the spatial allocation module 120 is dependent upon the desired spatial extent of the sound object 12.

A single sound object 12 may be simultaneously rendered in a set of spatial audio channels {S} by decomposing the audio signal 101 representing the sound object 12 into multiple different frequency sub-channels 111 and allocating each frequency sub-channel 111 to one of multiple spectrally-limited audio signals 113. Each spectrally-limited audio signals 113 is allocated to one spatial audio channel 114.

Where digital signal processing is used to distribute time-frequency bins to different spatial audio channels 114, then a short-term Fourier transform (STFT) 102 may be used to transform from the time domain to the frequency domain, where selective filtering occurs for each frequency band. The different spectrally-limited audio signals 113 may be created using the same time period or different time periods for each STFT. The different spectrally-limited audio signals 113 may be created by selecting frequency sub-channels 111 of the same bandwidth (different center frequencies) or different bandwidths. The different spatial audio channels {S} into which the spectrally-limited audio signals 113 are placed may be defined by a constant angular distribution e.g. the same solid angle ($\Delta\Omega = \sin\theta \cdot \Delta\theta \cdot \Delta\phi$ in spherical coordinates) or by a non-homogenous angular distribution e.g. different solid angles. An inverse transform 126 will be required to convert from the frequency to the time domain.

The distance of a sound object 12 from an origin at the user may be controlled by using a combination of direct and indirect processing of audio signals representing the sound object 12. The audio signals are passed in parallel through a "direct" path and one or more "indirect" paths before the outputs from the paths are mixed together This may occur as pre-processing to create the input audio signal 101.

The direct path represents audio signals that appear, to a listener, to have been received directly from an audio source and an indirect (decorrelated) path represents audio signals that appear to a listener to have been received from an audio source via an indirect path such as a multipath or a reflected path or a refracted path. Modifying the relative gain between the direct path and the indirect paths, changes the perception of the distance D of the sound object 12 from the listener in the rendered sound space 20. Increasing the indirect path gain relative to the direct path gain increases the perception of distance. The decorrelated path may, for example, introduce a pre-delay of at least 2 ms.

In some but not necessarily all examples, to achieve a sound object 12 with spatial extent (width and/or height and/or depth)_the spatial audio channels 114 are treated as spectrally distinct sound objects 12 that are then positioned at suitable widths and/or heights and/or distances using audio reproduction methods.

For example, in the case of loudspeaker sound reproduction amplitude panning can be used for positioning a spectrally distinct sound object 12 in the width and/or height dimension, and distance attenuation by gain control and optionally direct to reverberant (indirect) ratio can be used to position spectrally distinct sound objects 12 in the depth dimension.

For example, in case of binaural rendering, positioning in width and/or height dimension is obtained by selecting suitable head related transfer function (HRTF) filters (one for left ear, one for right ear) for each of the spectrally distinct sound objects depending on its position. A pair of HRTF filters model the path from a point in space to the listener's ears. The HRFT coefficient pairs are stored for all the possible directions of arrival for a sound. Similarly, distance dimension of a spectrally distinct sound object 12 is controlled by modelling distance attenuation with gain control and optionally direct to reverberant (indirect) ratio.

Thus, assuming that the sound rendering system supports width, then the width of a sound object 12 may be controlled by the spatial allocation module 120. It achieves the correct spatial rendering of the spatial audio channels 114 by controlled mixing 122 of the different spatial audio channels 114 across different width-separated audio device channels 124 that are rendered by different audio output devices.

Thus assuming that the sound rendering system supports height, then the height of a sound object 12 may be controlled in the same manner as a width of a sound object. The spatial allocation module 120 achieves the correct spatial rendering of the spatial audio channels 114 by controlled mixing 122 of the different spatial audio channels 114 across different height-separated audio device channels 124 that are rendered by different audio output devices.

Thus assuming that the sound rendering system supports depth, then the depth of a sound object 12 may be controlled in the same manner as a width of a sound object 12. The spatial allocation module 120 achieves the correct spatial rendering of the spatial audio channels 114 by controlled mixing 122 of the different spatial audio channels 114 across different depth-separated audio device channels 124 that are rendered by different audio output devices. However, if that is not possible, the spatial allocation module 120 may achieve the correct spatial rendering of the spatial audio channels 114 by controlled mixing 122 of the different spatial audio channels 114 across different depth-separated spectrally distinct sound objects 12 at different perception distances by modelling distance attenuation using gain control and optionally direct to reverberant (indirect) ratio.

It will therefore be appreciated that the extent of a sound object can be controlled widthwise and/or heightwise and/or depthwise.

Referring back to the preceding examples, in some situations, additional processing may be required. For example, when the sound space 20 is rendered to a listener through a head-mounted audio output device, for example headphones or a headset using binaural audio coding, it may be desirable for the rendered sound space to remain fixed in space when the listener turns their head in space. This means that the rendered sound space needs to be rotated relative to the audio output device by the same amount in the opposite sense to the head rotation. The orientation of the rendered sound space tracks with the rotation of the listener's head so that the orientation of the rendered sound space remains fixed in space and does not move with the listener's head. The system uses a transfer function to perform a transformation T that rotates the sound objects 12 within the sound space. A head related transfer function (HRTF) interpolator may be used for rendering binaural audio. Vector Base Amplitude Panning (VBAP) may be used for rendering in loudspeaker format (e.g. 5.1) audio.

FIGS. 4A, 4B, 5A, 5B, 6A, 6B. illustrate rendering of mediated reality using virtual content including spatial audio content. Spatial (or volumetric) audio involves the rendering of different sound objects at different three-dimensional locations. Each sound object can be individually controlled. For example, its intensity may be controlled, its position (location and/or orientation) may be controlled or other characteristics of the sound object may be individually controlled. This enables the relocation of sound sources within a sound scene that is rendered to a user. It also enables the engineering of that sound scene.

First spatial audio content may include second spatial audio content, if the second spatial audio content is the same as or is a sub-set of the first spatial audio content. For example, first spatial audio content includes second spatial audio content if all of the sound objects of the second spatial audio content are, without modification, also sound objects of the first spatial audio content.

In this context, mediated reality means the rendering of mediated reality for the purposes of achieving mediated reality for example augmented reality or virtual reality. In these examples, the mediated reality is first person perspective-mediated reality. It may or may not be user interactive. It may be 3DoF or 6DoF.

Figure 4A:
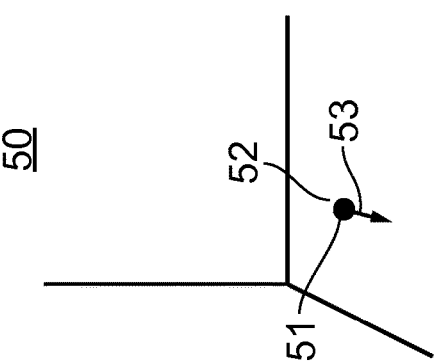
Figure 5A:
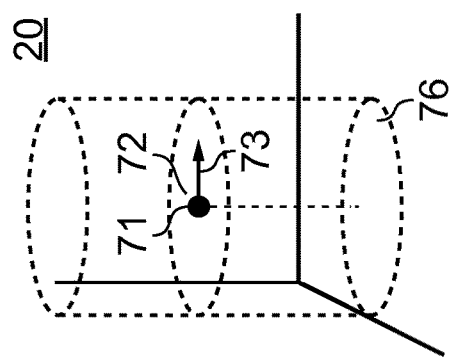
Figure 6A:
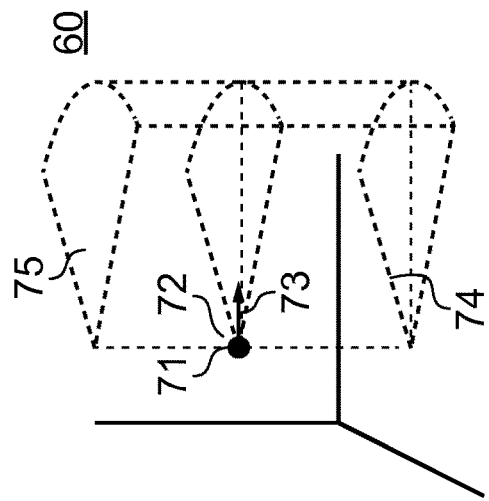

FIGS. 4A, 5A, 6A illustrate at a first time a real space 50, a sound space 20 and a visual space 60. There is correspondence between the sound space 20 and the virtual visual space 60. A user 51 in the real space 50 has a position defined by a location 52 and an orientation 53. The location is a three-dimensional location and the orientation is a three-dimensional orientation.

In 3DoF mediated reality, an orientation 53 of the user 51 controls a virtual orientation 73 of a virtual user 71. There is a correspondence between the orientation 53 and the virtual orientation 73 such that a change in the orientation 53 produces the same change in the virtual orientation 73. The virtual orientation 73 of the virtual user 71 in combination with a virtual field of view 74 defines a virtual visual scene 75 within the virtual visual space 60. In some examples, it may also define a virtual sound scene 76. A virtual visual scene 75 is that part of the virtual visual space 60 that is displayed to a user. A virtual sound scene 76 is that part of the virtual sound space 20 that is rendered to a user. The virtual sound space 20 and the virtual visual space 60 correspond in that a position within the virtual sound space 20 has an equivalent position within the virtual visual space 60. In 3DOF mediated reality, a change in the location 52 of the user 51 does not change the virtual position 72 or virtual orientation 73 of the virtual user 71.

In the example of 6DoF mediated reality, the situation is as described for 3DoF and in addition it is possible to change the rendered virtual sound scene 76 and the displayed virtual visual scene 75 by movement of a location 52 of the user 51.

For example, there may be a mapping between the location 52 of the user 51 and the virtual location 72 of the virtual user 71. A change in the location 52 of the user 51 produces a corresponding change in the virtual location 72 of the virtual user 71. A change in the virtual location 72 of the virtual user 71 changes the rendered sound scene 76 and also changes the rendered visual scene 75.

Figure 4B:
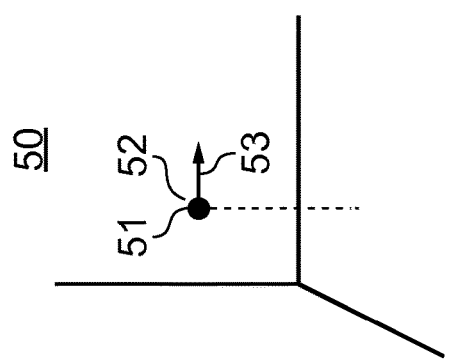
Figure 5B:
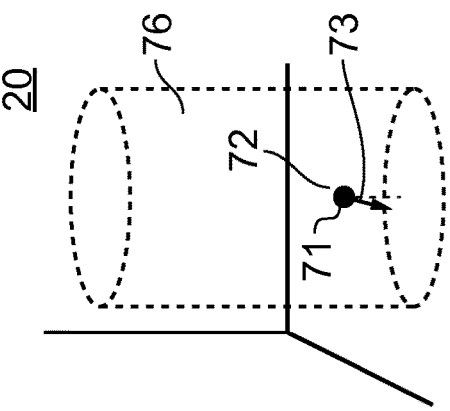
Figure 6B:
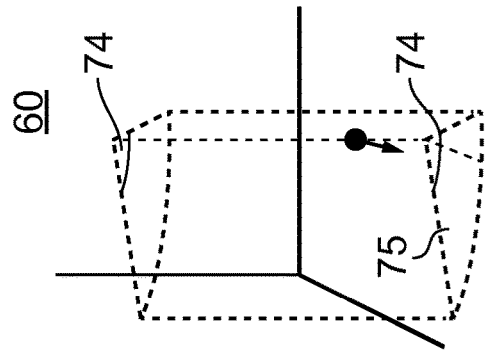

This may be appreciated from FIGS. 4B, 5B and 6B which illustrate the consequences of a change in location 52 and orientation 53 of the user 51 on respectively the rendered sound scene 76 (FIG. 5B) and the rendered visual scene 75 (FIG. 6B).

The virtual sound scene 76, defined by selection of spatial audio content in dependence upon a position 52, 53 of a user 51, is rendered for consumption by the user.

A change in location 52 of the user 51 may, in some examples, be detected as a change in location of user's head, for example by tracking a head-mounted apparatus, or a change in location of a user's body.

A change in orientation 53 of the user 51 may, in some examples, be detected as a change in orientation of user's head, for example by tracking yaw/pitch/roll of a head-mounted apparatus, or a change in orientation of a user's body.

FIG. 7. illustrates an example of a method 200 for enabling rendering, for consumption by a user, of first spatial audio content.

The method 200 comprises at block 202 causing selection of spatial audio content in dependence upon a position (e.g. location 52 and/or orientation 53) of a user 51

The method 200 comprises at block 204 causing rendering for consumption by the user, of the selected spatial audio content including first spatial audio content, as described with reference to FIGS. 4A, 4B, 5A, 5B.

The method 200 comprises at block 206 causing, after user consumption of the first spatial audio content, recording of data relating to the first spatial audio content.

The method 200 comprises at block 208 using at a later time, the recorded data to detect a new event relating to the first spatial audio content.

The method 200, at block 210, comprises providing a user-selectable option for the user to enable rendering, for consumption by the user of the first spatial audio content.

In some but not necessarily all examples, providing a user-selectable option, at block 210, comprises converting the first spatial audio content to a simplified form. If the first spatial audio content is in a multi-channel format, block 210 may comprise down-mixing the first spatial audio content to a mono-channel format. If the first spatial audio content is in a multi-object format, block 210 may comprise selection of one or more objects of the first spatial audio content. The simplified form may be a form that retains that part of the first spatial audio content that is of interest to the user 51 and removes that part of the first spatial audio content that is not of interest to the user 51. What is or is not of interest may be based upon a history of content consumption by the user. The user 51 is therefore made aware of meaningful changes to the spatial audio content.

Thus block 210, in some but not necessarily all examples, comprises causing rendering of a simplified sound object representative of the first spatial audio content or the new first spatial audio content.

At block 206, in some examples, consumption of the first spatial audio content is detected (or inferred) by monitoring a position (orientation 53 or location 52 and orientation 53) of the user 51. If the position 72, 73 of the virtual user 71 corresponding to the position 52, 53 of the user 51 correlates with the location of the first spatial audio content for at least a predetermined period of time then a decision may be made that the user has consumed the first spatial audio content. In some examples, the position 72, 73 of the virtual user 71 correlates with the location of the first spatial audio content if a) the location 72 of the virtual user and the location of the first spatial audio content are less than a threshold value and/or b) a vector defined by the location 72 of the virtual user 71 and the orientation 73 of the virtual user 71 intersects the location of the first spatial audio content within a threshold value.

If the user only seems to briefly focus on the first spatial audio content then it may be determined that the user has not yet consumed the first spatial audio content. It will of course be appreciated that there are many other and different ways of determining whether or not a user has consumed the first spatial audio content.

FIG. 8 illustrates an example of a portion of the method 200. In this example, examples of the blocks 208 and 210 of method 200 in FIG. 7, are illustrated in more detail.

In the method 200, at block 208, the method 200 comprises detecting that the first spatial audio content has been adapted to create new first spatial audio content. This may, for example, be detected by comparing recorded data for the first spatial audio content with equivalent data for the new first spatial audio content.

The method, at block 210, comprises providing a user-selectable option for the user to enable rendering, for consumption by the user of the new first spatial audio content. This may, for example, be achieved by causing rendering of a simplified sound object representative of the new first spatial audio content.

The recorded data relating to the first spatial audio content is data that records the consumption by the user of the first spatial audio content. The recorded data may, for example, comprise data identifying one or more of: the first spatial audio content; a version identifier of the first spatial audio content; an indication of when the user consumed the first spatial audio content; an indication of the user who consumed the first spatial audio content; an indication of a user device associated with rendering the first spatial audio content; an indication of the position of the user when the first spatial audio content was consumed; and a starting point of consumption and an ending point of consumption within the first audio spatial content.

In some, but not necessarily all, examples, the recorded data records all instances of the user consuming the first spatial audio content, or only a last predetermined number of times the user has consumed the first spatial audio content, or the last times the user has consumed the first spatial audio content within a predetermined period or the last time that the user has consumed the first spatial audio content. In addition, in some, but not necessarily all, examples, the recorded data concerning the first spatial audio content may expire and no longer be used at block 208. The expiration may occur when a criteria or criterion is satisfied. For example, any recorded data may expire after a predetermined period of time that may, for example, be user programmed. In addition, the user may be able to enable an "incognito" functionality in which user consumption during a particular period of time does not result in the recording of data relating to consumed spatial audio content.

It should be appreciated that although the method 200 in FIGS. 7 and 8 has been described in relation to first spatial audio content it also has application to any other spatial audio content. The first spatial audio content does not necessarily have to be predetermined in advance. It may for example be arbitrary spatial audio content that is selected by virtue of arbitrary, ad-hoc consumption by the user 51.

FIG. 9A illustrates an example of a sound space 20 comprising a large number of sound objects 12. The sound objects 12 may relate to the same or different services and applications. A virtual user 71 is also indicated within the sound space 20. As previously described, with reference to FIGS. 4A, 4B, 5A, 5B and FIG. 7, the position 72, 73 of the virtual user 71 selects spatial audio content for rendering and the position 72, 73 of the virtual user depends on the position 52, 53 of the user 51.

It can be difficult in these situations for the user 51 to determine which of the sound objects 12 the user 51 wishes to listen to.

In accordance with one aspect of the method 200, the sound space 20 is divided into different non-overlapping groups $404_i$ of one or more sound objects 12. Each of the groups $404_i$ is associated with a different non-overlapping volume $402_i$ of the sound space 20. FIG. 9B illustrates an example in which the sound space 20 of FIG. 9A has been divided into non-overlapping volumes $402_i$.

The groups $404_i$ may be formed using a clustering algorithm to cluster sound objects 12 or may be formed based upon proximity or interaction of sound objects 12. In other examples the groups $404_i$ may be annotated.

Each of the non-overlapping volumes $402_i$ may be considered to be a "room" that leads off a "lobby" 400. When a virtual user 71 enters a volume $402_i$, the sound objects 12 within that volume $402_i$ are rendered to the user 51. However, in order to simplify the sound space, each of the sound objects 12 of a group $404_i$ is not rendered to the user 51 when the virtual user 71 is outside the volume $402_i$ associated with that group $404_i$. Instead, when the virtual user 71 is in the lobby area 400 outside the volumes $402_i$, a simplified sound space 20 is rendered to the user 51 in accordance with the method 200.

Each of the volumes $402_i$ represents a user-selectable option for the user 51 to enable rendering, for consumption by the user 51, of spatial audio content defined by the sound objects 12 of the group $404_i$ associated with that volume $402_i$. The user selection may occur for example by the virtual user 71 staring at, approaching or entering the volume $402_i$.

In order for the user to comprehend what spatial audio content is associated with a particular volume $402_i$, it is desirable to render a simplified sound object representative of the spatial audio content for the group $404_i$ associated with the volume $402_i$ at the volume $402_i$ instead of rendering the sound objects 12 of the group $404_i$.

FIG. 10A illustrates volumes $402_i$ and the groups $404_i$ of sound objects 12 associated with those volumes $402_i$. FIG. 10A is similar to FIG. 9B and the arrangement of sound objects 12 and volumes $402_i$ are equivalent to those illustrated in FIGS. 9A and 9B. It will be understood from this figure that each of the volumes $402_i$ may comprise multiple sound objects 12.

FIG. 10B illustrates the rendering of a simplified sound object $12_i'$ representative of the spatial audio content of a group $402_i$ instead of the sound objects 12 of that group $402_i$.

FIG. 10C illustrates that a simplified sound object $12_i'$ may be rendered as an extended simplified sound object $12_i''$. In this example, each of the simplified sound objects $12_i'$ has been extended in length and breadth so that it may correspond, from the perspective of the virtual user 71, to a size of the volume $402_i$ with which it is associated. Each of the extended simplified sound objects $12_i''$ therefore forms a wall or facade for a volume $402_i$. The wall or façade may form a plane that is normal (perpendicular) to a point of view of the virtual user 71.

This is illustrated in more detail in the example of FIG. 11, where a virtual user 71 stands in front of a volume 402 with an extended simplified sound object 12" rendered on a front face of the volume 402. The extended simplified sound object 12" may have a width and a height that is dependent upon the size of the volume 402 and the orientation of the volume 402 with respect to the virtual user 71. If the volume 402 is re-scaled and changes size, then the extended simplified sound object 12" may be also re-scaled and changes size.

It will therefore be appreciated that the method 200 comprises, in some examples, dividing a sound space 20 into different non-overlapping groups $404_i$ of one or more sound objects 12 associated with different non-overlapping volumes $402_i$ of the sound space 20.

The method 200 comprises, at block 210, providing a user-selectable option for the user to enable rendering, for consumption by the user, of any one of the respective groups $404_i$ of one or more sound objects 12. Interacting with the associated volume $402_i$ causes user-selection of the option and consequent rendering of the group $404_i$ of one or more sound objects 12 associated with the volume $402_i$.

In some examples, interacting with the associated volume $402_i$ may occur by a virtual user 71 approaching, staring at or entering the volume $402_i$. The position of the virtual user may be changed by changing a position of the user 51.

Providing the user-selectable option for a group $404_i$ at block 210 comprises rendering a simplified sound object $12_i'$, $12_i''$ dependent upon a selected subset of the sound objects 12 of the group $404_i$.

In order to render a simplified sound object $12_i'$, $12_i''$ it is necessary to convert the spatial audio content associated with the multiple sound objects 12 within a group $404_i$ into a simplified form. If the spatial audio content is of a multi-channel format this may be achieved by down-mixing to a mono-channel format. If the spatial audio content is of a multi-object format, then it may be achieved by selection by one or more of the sound objects 12.

It should be appreciated that the user 51 by changing their position 52, 53 can change the position 72, 73 of the virtual user 71 within the sound space 20. This will change the sound scene rendered to the user 51. It is therefore possible for the user to move towards or look towards a particular volume $402_i$ or particular simplified sound object 12' or extended simplified sound object 12".

The arrangement of the simplified sound objects 12',12" about the virtual user 71 may be used as a user interface (man machine interface) for example a three-dimensional menu system where each of the different volumes $402_i$ represents a different selectable menu category and each of the sound objects 12 within the group $404_i$ associated with a particular volume $402_i$ represents an entry in that menu category.

The single simplified sound object 12',12" that is rendered to the user at a volume $402_i$ may be rendered in a manner dependent upon the user position and, in particular, dependent upon the user position relative to the respective locations of the single simplified sound objects 12',12".

As previously described in relation to FIG. 8, providing the user-selectable option for the user to enable rendering for consumption by the user of first spatial audio content may comprise providing a user-selectable option for the user to enable rendering, for consumption by the user, of the new first spatial audio content. In this example, the simplified sound object 12', 12" that is rendered to identify the user-selectable option is based upon the new first spatial audio content.

The method 200 may therefore provide a user-selectable option for the user to enable rendering for consumption by the user, of spatial audio content by causing rendering of a simplified sound object 12" dependent upon a selected subset of a group $404_i$ of one or more sound objects 12 of the new first spatial audio content, at a selected position dependent upon a volume $402_i$ associated with the group $404_i$ of one or more sound objects 12 and with an extent dependent upon the volume $402_i$ associated with the group $404_i$ of one or more sound objects 12. The simplified sound object 12', 12" extends in a vertical plane as a wall or facade.

In some but not necessarily all examples, the simplified sound object 12', 12" is based upon spatial audio content that is different in the new first spatial audio content compared to the previous first spatial audio content. That is, the simplified sound object 12', 12" gives an indication of what has changed. In this way the simplified sound object 12', 12" provides a limited preview of the new first spatial audio content.

In some but not necessarily all examples, the simplified sound object 12', 12" depends upon how the new first spatial audio content for consumption differs from the user-consumed first spatial audio content and there is an emphasis on those channels/objects that are changed.

It may for example be desirable to highlight any new first spatial audio by rendering the new first spatial audio in preference to other spatial audio content. This may for example be achieved by bringing the new spatial audio content closer or elevating it or otherwise emphasizing it.

Figure 12A:
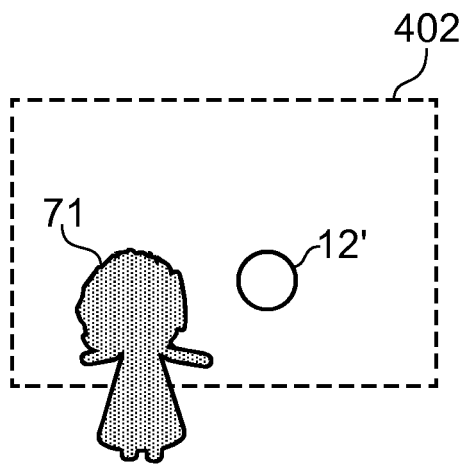

FIG. 12A illustrates a simple example in which a simplified sound object 12' is rendered to the virtual user 71 at a volume 402. The simplified sound object 12' may be based on the new first spatial audio content and may, for example, be based on a sound object 12 that has changed.

The simplified sound object 12' indicates a user-selectable option for the user that, if selected, enables rendering of new first spatial audio content. The new first spatial audio content is defined by the sound objects 12 of the group 404 associated with the volume 402. The user-selectable option may be selected by the virtual user 71 interacting with the volume 402.

Figure 12B:
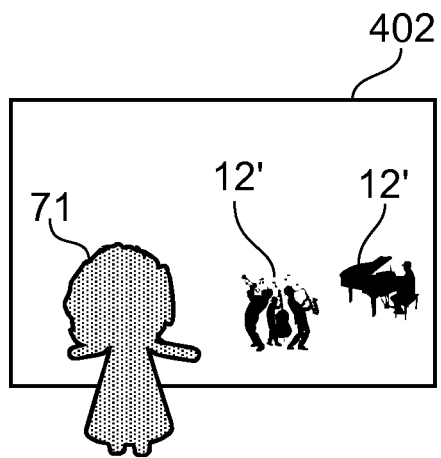

FIG. 12B illustrates a similar example to that illustrated in FIG. 12A. However, in this example, two simplified sound objects 12' are rendered. The simplified sound objects 12' may be based on the new first spatial audio content and may, for example, be based respectively on sound objects 12 that have changed.

Figure 12C:
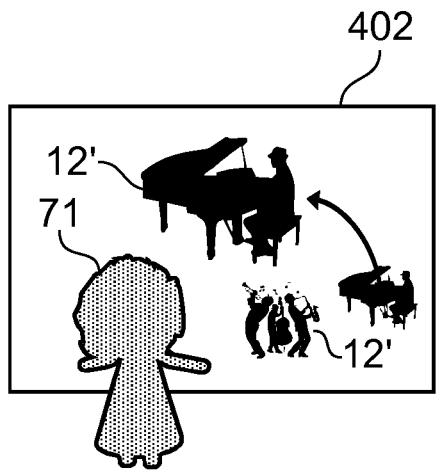

FIG. 12C is similar to FIG. 12B except that in this example one of the simplified sound objects 12 is highlighted by being elevated. The highlighting may, for example, indicate that the elevated simplified sound objects 12' is based on new first spatial audio content, for example, based on a sound object 12 that has changed.

Figure 12D:
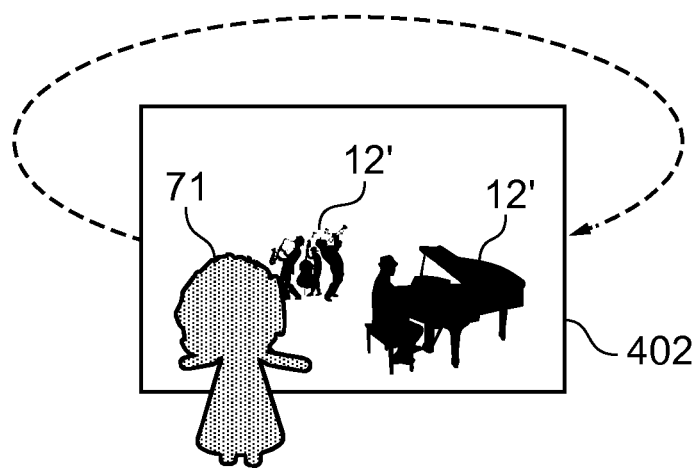

FIG. 12D is similar to FIG. 12B except that in this example one of the simplified sound objects 12 is highlighted by being brought closer to the virtual user 71. In this example, orientation of the volume 402 is changed to bring the simplified audio object 12' associated with the new spatial audio content closer to the virtual user 71.

The examples of simplified sound objects 12 illustrated in FIGS. 12A to 12D may be provided as part of or instead of the facade previously described in relation to the volume 402. In such examples, instead of rendering a single extended simplified sound object 12 to form the facade, a scene comprising the simplified sound objects 12, including the highlighted one of the simplified sound object 12, forms the façade. The scene may be extended in length and breadth so that it may correspond, from the perspective of the virtual user 71, to a size of the volume $402_i$ with which it is associated. The scene of simplified sound objects $12_i''$ therefore forms a wall or facade for the volume $402_i$. The wall or façade may form a plane that is normal (perpendicular) to a point of view of the virtual user 71 and that extends in a vertical plane.

In other examples, the facade may be rendered when the virtual user 71 is at a distance from a volume 402 and the examples illustrated in FIGS. 12A to 12D may be rendered as a preview when the virtual user 71 approaches the volume 402.

FIG. 13 illustrates an example in which different rendering processes, depend upon a location of the virtual user 71.

At block 502, when the virtual user 71 is outside the volumes $402_i$ in the lobby 400, the method 200 causes rendering of simplified sound objects 12', 12" for each of the volumes $402_i$ that is dependent upon a selected first subset of the sound objects 12 of the group $404_i$ associated with that volume $402_i$.

At block 506, when the virtual user 71 is inside a volume $402_i$ associated with a group $404_i$ of sound objects 12, the method 200 causes rendering of the sound objects 12 of that group $404_i$.

The transition between being in the lobby 400 and being within the volume $402_i$ is handled at block 504. When the virtual user 71 is moving from outside a volume $402_i$ to inside the volume $402_i$, the method 200 causes rendering of a selected second subset of the sound objects 12 of the group $404_i$ associated with that volume $402_i$. This selected second subset is a larger subset than the first subset used to render the simplified sound object 12', 12" at block 502.

In this way there is a smooth transition from the lobby 400 where a simplified sound object 12', 12" is rendered to the volume $402_i$ where all of the sound objects 12 are rendered.

The sound objects 12 of the second sub-set rendered during the transition phase 504 may include a first sound object associated with a close-up recording at a first location and a second sound object associated with background recording at a second location. The sound objects 12 of the second sub-set rendered during the transition phase 504 are separated spatially. Reverberation may be added to the rendering.

The sound objects 12 of the first sub-set rendered during the lobby phase 502 as the simplified sound object 12', 12" may include only the first sound object associated with a close-up recording at a first location or only a second sound object associated with background recording at a second location. The sound object 12 of the first sub-set rendered during the lobby phase 502 as the simplified sound object 12', 12" is extended and repositioned to form a façade.

In one use case, a user 51 has placed a jazz room (volume $402_i$) in his multi-room content consumption space along with other volumes 402. A song is playing in the volume $402_i$, and the user 51 has heard this song before. While the virtual user 71 is outside any volume 402 (e.g. the virtual user 71 is in the lobby space 400), the user 51 can hear a downmix of the song. The volume $402_i$ has a simplified sound object $12_i''$ for the song indicating a size of the jazz club which scales with the size of the volume $402_i$.

In this example, because of the presence of the simplified sound object $12_i''$ for the song, the user 51 knows that since his latest visit to the room $402_i$ an alternative song has been added by a content provider. Thus, the spatial audio content the user has experienced before has changed in a significant way, and this is indicated to the user 51 in a nonintrusive way by the rendered simplified sound object 12', 12" which highlights the new spatial audio content.

There is consequentially a memory effect for each room 402. At least a state for when the virtual user 71 has last been in a room 402 is saved as metadata. Alternatively and in addition, this memory status may cover all the user's 51 visits to the room, visits in a certain timespan, or a specific number of latest visits, etc. This metadata includes, e.g., information related to the audio objects 12 of the spatial audio content. In this case, information about the music tracks and the musicians performing on each track the user has listened to have been stored.

Thus, when a relevant change (which may be defined, e.g., by the content provider or the user himself) happens in the room's spatial audio content, it is detected. This change drives the content of the simplified sound object 12', 12" presented as a façade to the room 402, which in turn controls a preview of the room 402 the user 51 hears. The room 402 may be rotated for the virtual user 71 such that the new piano track is spatially closer to the virtual user 71 and clearly audible to the user 51. In some examples, both the old spatial audio content and the new spatial audio content are previewed sequentially. The user 51 therefore understands there is a new piano track, and an option to render that track. The user 51 selects that option by controlling the virtual user 71 to enter the room 402.

Relevant changes to spatial audio content defined by sound objects 12 in a group 404 associated with a volume 402, may be indicated by adapting the façade rendering parameters. For example, a multichannel recording (e.g., 5.1) may be updated into a 22.2-channel presentation which adds height channels and the height may be used to highlight the change (FIG. 12C). A new track that has received positive feedback from consumers may be elevated high above other content, while another track that has received poor reviews would be rendered towards a corner of the volume 402.

In some example, when a virtual user 71 approaches a volume 402, what is presented by a volume 402 changes. At a distance a simple downmix may be presented as a façade controlled, for example, by a set of extent, balance and rotation parameters. As the user approaches, a spatial preview is presented. This preview is a more complex rendering than a downmix. For example, the dominant sound objects 12 are rendered as spatially distinct objects in the sound space 20 and rendered according to different positions in the volume 402. The different positions may be based upon a preferred listening position of the virtual user 71, which may have been recorded as metadata based on use or set by the user 51.

FIG. 14A presents an example method 700 based on the method 200.

At block 702, the virtual user 71, who is in a first volume (room) $402_1$, is presented with first spatial audio content in the first room $402_1$. This spatial audio content may be of any type, but in this example, we consider an immersive volumetric audio (6DoF).

At block 704, it is detected when the virtual user 71 exits the volume $402_1$ and enters the lobby space 400.

At block 708, the virtual user 71 is presented, with a multi-room spatial audio experience (FIGS. 10B, 10C). A simplified sound object $12_1'$, $12_1''$ is created that is selected (714) and rendered (718), as a façade for the volume $402_1$, to the virtual user 71 in the lobby 400. This occurs for each volume 402. There are therefore multiple simplified sound objects 12', 12" presented that inform the user 51 of the spatial audio content associated with each volume 402 without rendering the full spatial audio content for each volume 402. Each volume 402 is an option for rendering to the user 51 the full spatial audio content associated with that volume 402 and the option may be selected by the virtual user 71 entering the volume 402.

At block 706, when the virtual user exits the first volume $402_1$, corresponding metadata is stored.

At blocks 710, 712, when a subsequent change occurs related to the stored metadata for the first volume $402_1$, a new simplified sound object $12_1'$, $12_1''$ is created at block 716 that is selected (714) and rendered (718) as a façade from the volume $402_1$ to the virtual user 71 in the lobby 400. Examples have been described previously, for example, with reference to FIGS. 10C, 11 and 12A to 12D. As an example, if the current metadata for the volume $402_1$ changes so that it is different or significantly different to the stored metadata for the volume $402_1$, a new simplified sound object $12_1'$, $12_1''$ may be created as a downmix, based on spatial audio content associated with the changed metadata, that is rendered as a façade from the volume $402_1$ to the virtual user 71 in the lobby 400.

FIG. 14B presents an example method 800 based on the method 200 that extends the method 700 illustrated in FIG. 14A to include a preview feature.

The blocks 702, 704, 706, 708, 710, 712, 714, 716, 718 operates as described with reference to FIG. 14A.

However, block 718 occurs if the virtual user 71 is distant from the room $402_1$. This corresponds to block 502 in FIG. 13.

If the virtual user 71 is not distant from the room $402_1$ and is, for example, approaching the room $402_1$ or focusing on the room $402_1$, then a preview functionality occurs via block 802, 804, 806 instead of block 718. This, for example, corresponds to block 504 in FIG. 13.

At block 804, a preview is created. The preview may consist of the most relevant (e.g., most dominant, those that are new, etc.) sound objects 12 in the group $404_1$ associated with the volume $402_1$. The selected audio objects 12 are rendered as spatial audio objects with distinct positions during the preview. If an ambiance component is also played, it can be played as a spatially extended mono source. Simplified sound objects 12', 12", for example downmixes, of other nearby room 402 in lobby space 400 may be rendered according to block 718.

In one embodiment, the preview includes a first playback of previously experienced content followed by the updated content.

Referring back to the previous example of a use case, in which a user 51 has placed a jazz room (volume 402i) in his multi-room content consumption space along with other volumes 402 (e.g. FIG. 10C). A new version of a favorite song is available. While the virtual user 71 is outside, and at a distance from, the jazz room (e.g. the virtual user 71 is in the lobby space 400), the user 51 can hear a downmix of the new version of the song. The volume 402i has a simplified sound object 12i''' for the new version of the song presented as a façade indicating a size of the jazz club which scales with the size of the volume 402i (e.g. FIG. 11).

If the user approaches the jazz room, then multiple simplified sound objects 12' are rendered and one of the simplified sound objects 12, relating to content that has changed, is highlighted by being brought closer to the virtual user 71, which in turn controls a preview of the room 402 the user 51 hears (e.g. FIGS. 12A to 12D). For example, the jazz room may be rotated for the virtual user 71 such that a new piano track is spatially closer to the virtual user 71 and clearly audible to the user 51 (e.g. FIG. 12D). The user 51 therefore understands there is a new piano track, and has an option to render the new version of the song in spatial audio. The user 51 selects that option by controlling the virtual user 71 to enter the room 402. In some examples, when the jazz room is rotated both the old song and the new version of the song are rendered sequentially in short excerpts of the same song portion. The user 51 therefore understands how the new version differs from the previous version.

A benefit of the preview with memory effect is that the user 51 can better perceive any significant updates to spatial audio content he has already consumed.

According to some but not necessarily all examples, the preview is personalized based on the user's preferred listening position allowing the user 51 to preview the change in a way that provides the highest relevant differentiation against the previous experience.

At blocks 810, 812 when the user is in the volume $402_1$ previously, the virtual user 71 position and rotation is tracked in order to record the user's preferred listening/viewing position (point of view). In some cases, the user 51 may also indicate the preferred position using a user interface. At block 802, the preferred point of view is used to position the selected sound objects 12 so that they are rendered at block 806 as if the virtual user 71 was at the preferred point of view, despite being in the lobby 400.

FIG. 15A illustrates an example of an apparatus 620 that is configured to perform the above described methods. The apparatus 620 comprises a controller 610 configured to control the above described methods.

Implementation of a controller 610 may be as controller circuitry. The controller 610 may be implemented in hardware alone, have certain aspects in software including firmware alone or can be a combination of hardware and software (including firmware).

As illustrated in FIG. 15A the controller 610 may be implemented using instructions that enable hardware functionality, for example, by using executable instructions of a computer program 606 in a general-purpose or special-purpose processor 602 that may be stored on a computer readable storage medium (disk, memory etc) to be executed by such a processor 602.

The processor 602 is configured to read from and write to the memory 604. The processor 602 may also comprise an output interface via which data and/or commands are output by the processor 602 and an input interface via which data and/or commands are input to the processor 602.

The memory 604 stores a computer program 606 comprising computer program instructions (computer program code) that controls the operation of the apparatus 620 when loaded into the processor 602. The computer program instructions, of the computer program 606, provide the logic and routines that enables the apparatus to perform the methods illustrated in FIGS. 7 and 8. The processor 602 by reading the memory 604 is able to load and execute the computer program 606.

The apparatus 620 therefore comprises:

at least one processor 602; and at least one memory 604 including computer program code the at least one memory 604 and the computer program code configured to, with the at least one processor 602, cause the apparatus 620 at least to perform:

causing selection of spatial audio content in dependence upon a position 52, 53 of a user 51;

causing rendering, for consumption by the user 51, of the selected spatial audio content including first spatial audio content;

causing, after user consumption of the first spatial audio content, recording of data relating to the first spatial audio content;

using, at a later time, the recorded data to detect a new event relating to the first spatial audio content; and providing a user-selectable option for the user 51 to enable rendering, for consumption by the user 51, of the first spatial audio content.

As illustrated in FIG. 15B, the computer program 606 may arrive at the apparatus 620 via any suitable delivery mechanism 630. The delivery mechanism 630 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 606. The delivery mechanism may be a signal configured to reliably transfer the computer program 606. The apparatus 620 may propagate or transmit the computer program 606 as a computer data signal.

Although the memory 604 is illustrated as a single component/circuitry it may be implemented as one or more separate components/circuitry some or all of which may be integrated/removable and/or may provide permanent/semi-permanent/dynamic/cached storage.

Although the processor 602 is illustrated as a single component/circuitry it may be implemented as one or more separate components/circuitry some or all of which may be integrated/removable. The processor 602 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 7 and 8 may represent steps in a method and/or sections of code in the computer program 606. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
at least one processor; and
at least one memory including computer program code,
the at least one memory and the computer program code configured to, with the at least one processor, cause the apparatus to perform at least the following:
select spatial audio content in dependence upon a position of a user in a virtual space;
render, for consumption by the user, the selected spatial audio content comprising a first spatial audio content;
responsive to user consumption of the first spatial audio content, update recorded data related to the first spatial audio content with spatial audio metadata, wherein the user consumption of the first spatial audio content is determined based on the position of the user in the virtual space correlating with a position of the first spatial audio content in the virtual space for at least a predetermined amount of time, and wherein the spatial audio metadata comprises data identifying the first spatial audio content, a version identifier of the first spatial audio content, and at least one of an indication of when the user consumed the first spatial audio content, an indication of the user who consumed the first spatial audio content, an indication of a user device associated with rendering the first spatial audio content, an indication of a position of the user when the first spatial audio content was consumed, or a starting point of consumption or an ending point of consumption within the first audio spatial audio content;
use the spatial audio metadata within the recorded data to detect another event relating to the first spatial audio content; and
provide a user-selectable option to enable rendering, for consumption by the user, of the first spatial audio content by rendering a simplified sound object representative of the first spatial audio content, wherein the simplified sound object is elevated in the virtual space or moved closer to the user in the virtual space in response to detecting the other event relating to the first spatial audio content.

2. The apparatus as claimed in claim 1, wherein using the recorded data to detect another event comprises detecting that the first spatial audio content has been adapted to create new first spatial audio content; and wherein providing a user-selectable option for the user to enable rendering, for consumption by the user, of the first spatial audio content comprises providing a user-selectable option for the user to enable rendering, for consumption by the user, of the new first spatial audio content.

3. The apparatus as claimed in claim 2, wherein providing a user-selectable option for the user to enable rendering, for consumption by the user, of the first spatial audio content comprises rendering a limited preview of the new first spatial audio content.

4. The apparatus as claimed in claim 3, wherein the limited preview depends upon how the new first spatial audio content for consumption differs from the user-consumed first spatial audio content.

5. The apparatus as claimed in claim 2, wherein providing a user-selectable option for the user to enable rendering, for consumption by the user, of the first spatial audio content comprises causing rendering of a simplified sound object dependent upon a selected subset of a group of one or more sound objects of the new first spatial audio content, at a selected position dependent upon a volume associated with the group of one or more sound objects and with an extent dependent upon the volume associated with the group of one or more sound objects.

6. The apparatus as claimed in claim 2, wherein providing a user-selectable option for the user to enable rendering, for consumption by the user, of the first spatial audio content comprises highlighting the new first spatial audio by rendering the new first spatial audio in preference to other spatial audio content.

7. The apparatus as claimed in claim 1, wherein providing a user-selectable option for the user to enable rendering, for consumption by the user, of the first spatial audio content comprises causing rendering of a simplified sound object that extends in a vertical plane.

8. The apparatus as claimed in claim 1, further caused to:
divide a sound space into different non-overlapping groups of one or more sound objects associated with different non-overlapping volumes of the sound space; and
provide a user-selectable option for the user to enable rendering, for consumption by the user, of any one of the respective groups of one or more sound objects by interacting with the associated volume,
wherein providing a user-selectable option for a first group comprises rendering a simplified sound object dependent upon a selected subset of the sound objects of the first group.

9. The apparatus as claimed in claim 8, wherein interacting with the associated volume occurs by a virtual user approaching, staring at or entering the volume, wherein a position of the virtual user changes with a position of the user.

10. The apparatus as claimed in claim 1, further caused to:
change a position of a virtual user when a position of the user changes;
cause, when the virtual user is outside a first volume associated with the first group, rendering of a simplified sound object dependent upon a selected first subset of the sound objects of the first group;
cause, when the virtual user is inside the first volume associated with the first group, rendering of the sound objects of the first group; and
cause, when the virtual user is moving from outside the first volume to inside the first volume, rendering of a selected second subset of the sound objects of the first group.

11. The apparatus as claimed in claim 1, further caused to:
responsive to detecting the another event relating to the first spatial audio content, rotate a perspective of the virtual space such that the first spatial audio content is spatially closer to the user.

12. The apparatus as claimed in claim 1, wherein the first spatial audio content is located in a volume of a plurality of non-overlapping volumes of the sound space and comprises one or more sound objects.

13. The apparatus as claimed in claim 12, wherein the at least one memory and the computer program code are further configured to, with the at least one processor, cause the apparatus to:
provide a user-selectable option to enable rendering, for consumption by the user, of the first spatial audio content by rendering an extended simplified sound object comprising one or more simplified sound objects representative of the one or more sound objects in the first spatial audio content, wherein the extended simplified sound object comprises a width and a height dependent upon a size of the volume where the first spatial audio content is located.

14. A method comprising:
causing selection of spatial audio content in dependence upon a position of a user in a virtual space;
causing rendering, for consumption by the user of the selected spatial audio content comprising first spatial audio content;
causing, responsive to user consumption of the first spatial audio content, updating of recorded data related to the first spatial audio content with spatial audio metadata, wherein the user consumption of the first spatial audio content is determined based on the position of the user in the virtual space correlating with a position of the first spatial audio content in the virtual space for at least a predetermined amount of time, and wherein the spatial audio metadata comprises data identifying the first spatial audio content, a version identifier of the first spatial audio content, and at least one of an indication of when the user consumed the first spatial audio content, an indication of the user who consumed the first spatial audio content, an indication of a user device associated with rendering the first spatial audio content, an indication of a position of the user when the first spatial audio content was consumed, or a starting point of consumption or an ending point of consumption within the first audio spatial audio content;
using the spatial audio metadata within the recorded data to detect another event relating to the first spatial audio content; and
providing a user-selectable option for the user to enable rendering, for consumption by the user, of the first spatial audio content by rendering a simplified sound object representative of the first spatial audio content, wherein the simplified sound object is elevated in the virtual space or moved closer to the user in the virtual space in response to detecting the other event relating to the first spatial audio content.

15. The method as claimed in claim 14, wherein using the recorded data to detect another event comprises detecting that the first spatial audio content has been adapted to create new first spatial audio content; and wherein providing a user-selectable option for the user to enable rendering, for consumption by the user, of the first spatial audio content comprises providing a user-selectable option for the user to enable rendering, for consumption by the user, of the new first spatial audio content.

16. The method as claimed in claim 15, wherein using the recorded data to detect another event comprises comparing recorded data for the first spatial audio content with equivalent data for the new first spatial audio content.

17. The method as claimed in claim 15, wherein providing a user-selectable option for the user to enable rendering, for consumption by the user, of the first spatial audio content comprises causing rendering of a simplified sound object representative of the first spatial audio content before or after adaptation.

18. The apparatus as claimed in claim 15, wherein providing a user-selectable option for the user to enable rendering, for consumption by the user, of the first spatial audio content comprises rendering a limited preview of the new first spatial audio content.

19. The apparatus as claimed in claim 18, wherein the limited preview depends upon how the new first spatial audio content for consumption differs from the user-consumed first spatial audio content.

20. A non-transitory computer readable medium comprising program instructions stored thereon for performing at least the following:
select spatial audio content in dependence upon a position of a user in a virtual space;
render, for consumption by the user, the selected spatial audio content comprising a first spatial audio content;
responsive to user consumption of the first spatial audio content, update recorded data related to the first spatial audio content with spatial audio metadata, wherein the user consumption of the first spatial audio content is determined based on the position of the user in the virtual space correlating with a position of the first spatial audio content in the virtual space for at least a predetermined amount of time, and wherein the spatial audio metadata comprises data identifying the first spatial audio content, a version identifier of the first spatial audio content, and at least one of an indication of when the user consumed the first spatial audio content, an indication of the user who consumed the first spatial audio content, an indication of a user device associated with rendering the first spatial audio content, an indication of a position of the user when the first spatial audio content was consumed, or a starting point of consumption or an ending point of consumption within the first audio spatial audio content;
use the spatial audio metadata within the recorded data to detect another event relating to the first spatial audio content; and
provide a user-selectable option to enable rendering, for consumption by the user, of the first spatial audio content by rendering a simplified sound object representative of the first spatial audio content, wherein the simplified sound object is elevated in the virtual space or moved closer to the user in the virtual space in response to detecting the other event relating to the first spatial audio content.

* * * * *